(12) United States Patent
Yamazaki et al.

(10) Patent No.: US 11,692,625 B2
(45) Date of Patent: Jul. 4, 2023

(54) CONTINUOUSLY VARIABLE TRANSMISSION AND CONTROL METHOD FOR CONTINUOUSLY VARIABLE TRANSMISSION

(71) Applicant: JATCO Ltd, Fuji (JP)

(72) Inventors: Masanori Yamazaki, Isehara (JP); Kouhei Toyohara, Sagamihara (JP); Yoshiteru Kanayama, Yokohama (JP); Takashi Saitou, Isehara (JP); Tadaaki Hiraoka, Atsugi (JP); Satoshi Ohata, Atsugi (JP)

(73) Assignee: JATCO LTD, Fuji (JP)

( * ) Notice: Subject to any disclaimer, the term of this patent is extended or adjusted under 35 U.S.C. 154(b) by 38 days.

(21) Appl. No.: 17/433,094

(22) PCT Filed: Nov. 1, 2019

(86) PCT No.: PCT/JP2019/043125
§ 371 (c)(1),
(2) Date: Aug. 23, 2021

(87) PCT Pub. No.: WO2020/202624
PCT Pub. Date: Oct. 8, 2020

(65) Prior Publication Data
US 2022/0145988 A1    May 12, 2022

(30) Foreign Application Priority Data
Apr. 2, 2019  (JP) ................................ 2019-070606

(51) Int. Cl.
*F16H 61/662*    (2006.01)
*F16H 9/18*      (2006.01)
(Continued)

(52) U.S. Cl.
CPC ........ *F16H 61/66272* (2013.01); *F16H 9/18* (2013.01); *F16H 59/48* (2013.01);
(Continued)

(58) Field of Classification Search
CPC . F16H 9/18; F16H 59/48; F16H 59/58; F16H 59/66; F16H 61/12;
(Continued)

(56) References Cited

U.S. PATENT DOCUMENTS 9,933,053 B2 *  4/2018  Yoshimura .............. F16H 63/06
2006/0037415 A1 *  2/2006  Kuroda .................... F16H 57/01
                                                           73/865.9

(Continued)

FOREIGN PATENT DOCUMENTS

JP   2017-516966 A    6/2017
WO  WO-2015/177372 A1  11/2015

*Primary Examiner* — Edwin A Young
(74) *Attorney, Agent, or Firm* — Foley & Lardner LLP

(57) ABSTRACT

A continuously variable transmission includes a primary pulley, a secondary pulley, a metal belt and a controller. The metal ring includes a ring and a plurality of elements bundled by the ring. The elements have respective receiving portions opening in a radial direction of the metal belt and receive the ring in the receiving portions. Assuming a direction perpendicular to a circumferential direction and a radial direction of the metal belt as a lateral direction L, the controller executes a falling-off countermeasure control of the element when a relative movement of the element in the lateral direction L with respect to the ring is detected or a presence of an action of a force on the element which causes such relative movement is detected.

14 Claims, 12 Drawing Sheets

(51) Int. Cl.
*F16H 59/48* (2006.01)
*F16H 59/58* (2006.01)
*F16H 59/66* (2006.01)
*F16H 61/12* (2010.01)
*F16H 61/66* (2006.01)

(52) U.S. Cl.
CPC ............ *F16H 59/58* (2013.01); *F16H 59/66* (2013.01); *F16H 61/12* (2013.01); *F16H 2061/124* (2013.01); *F16H 2061/1272* (2013.01); *F16H 2061/6607* (2013.01); *F16H 2061/66277* (2013.01)

(58) Field of Classification Search
CPC ....... F16H 61/66272; F16H 2061/6629; F16H 2061/66295; F16H 2061/124; F16H 2061/1272; F16H 2061/6607; F16H 2061/66277
See application file for complete search history.

(56) References Cited

U.S. PATENT DOCUMENTS

2012/0244974 A1* 9/2012 Tsuji .................. F16H 55/56
474/28
2017/0299050 A1* 10/2017 Sakagami ............. F16H 59/141
2018/0328482 A1* 11/2018 Kanehara .............. F16H 61/662

* cited by examiner

CONTINUOUSLY VARIABLE TRANSMISSION AND CONTROL METHOD FOR CONTINUOUSLY VARIABLE TRANSMISSION

TECHNICAL FIELD

The present invention relates to a continuously variable transmission and a control method thereof, in particular, relates to a technique to suppress fall-off of an element disposed in a belt of the continuously variable transmission.

BACKGROUND ART

There has been known a continuously variable transmission that includes a belt configured by bundling a plurality of transverse members, which are media or elements that transmit a power, with a ring or a circular band as a continuously variable transmission configured to steplessly adjust a speed ratio by changing a contact diameter of the belt against a pair of variable pulleys. JP2017-516966A discloses a belt that includes an element formed into an approximate U-shape as a belt applied to such a continuously variable transmission (paragraphs 0025 to 0027). This element has a base portion and a pair of pillar portions extending in the same direction from both ends of the base portion, and is mounted on one ring through an opening between the pillar portions.

SUMMARY OF INVENTION

In a continuously variable transmission that transmits a power via elements, there is a case where a gap (referred to as an "end play") between adjacent elements widens to increase a total quantity of the end plays over a whole circumference of the belt. In such a state, it is concerned that the end plays locally concentrate, and furthermore, a force in a lateral direction is applied on the elements to cause the elements to fall off of the ring. This is because, although in JP2017-516966A, a hook is provided in the pillar portion of the element and the element is locked to the ring by this hook, when the force in the lateral direction is applied to the elements and the elements move in the lateral direction with respect to the ring, the lock with the hook is released. The widened end play is generated by, besides a generation of extension in the ring, a compression of the elements caused by other elements, and an abrasion caused by friction between the elements.

In consideration of the problems described above, an objective of the present invention is to provide a continuously variable transmission that ensures suppressing an element having a receiving portion, which receives a ring and opens in a radial direction of a belt, from falling off of the ring and a control method thereof.

According to an aspect of the present invention, a continuously variable transmission mounted on a vehicle, including a primary pulley, a secondary pulley, and a belt wound around the primary pulley and the secondary pulley, is provided. In this aspect, the belt includes a ring, and a plurality of elements bundled by the ring, the elements having respective receiving portions opening in a radial direction of the belt, the elements receiving the ring in the receiving portions. The controller is configured to, assuming a direction perpendicular to a circumferential direction and a radial direction of the belt as a lateral direction, detect a relative movement of the element in the lateral direction with respect to the ring or detects a presence of an action of a force in the lateral direction on the element; and executes a preliminarily determined falling-off countermeasure control of the element when the relative movement of the element is detected or the action of the force on the element is detected.

According to another aspect of the present invention, a control method for controlling a continuously variable transmission, the continuously variable transmission including a plurality of elements receiving a ring in receiving openings in a radial direction of a belt and being bundled by the ring, is provided. In this aspect, assuming a direction perpendicular to a circumferential direction and a radial direction of the belt as a lateral direction, a relative movement of the element in the lateral direction with respect to the ring is detected or a presence of an action of a force in the lateral direction on the element is detected. A preliminarily determined falling-off countermeasure control of the element is executed when the relative movement of the element is detected or the action of the force on the element is detected.

These configurations ensure suppressing the element from falling off of the ring by executing a predetermined falling-off countermeasure control when a relative movement of the element with respect to the ring is detected or a presence of an action of a force that causes such a relative movement (a force in the lateral direction on the element) is detected.

DESCRIPTION OF EMBODIMENTS

The following describes embodiments of the present invention with reference to the drawings.

Configuration of Vehicle Drive System

Figure 1:
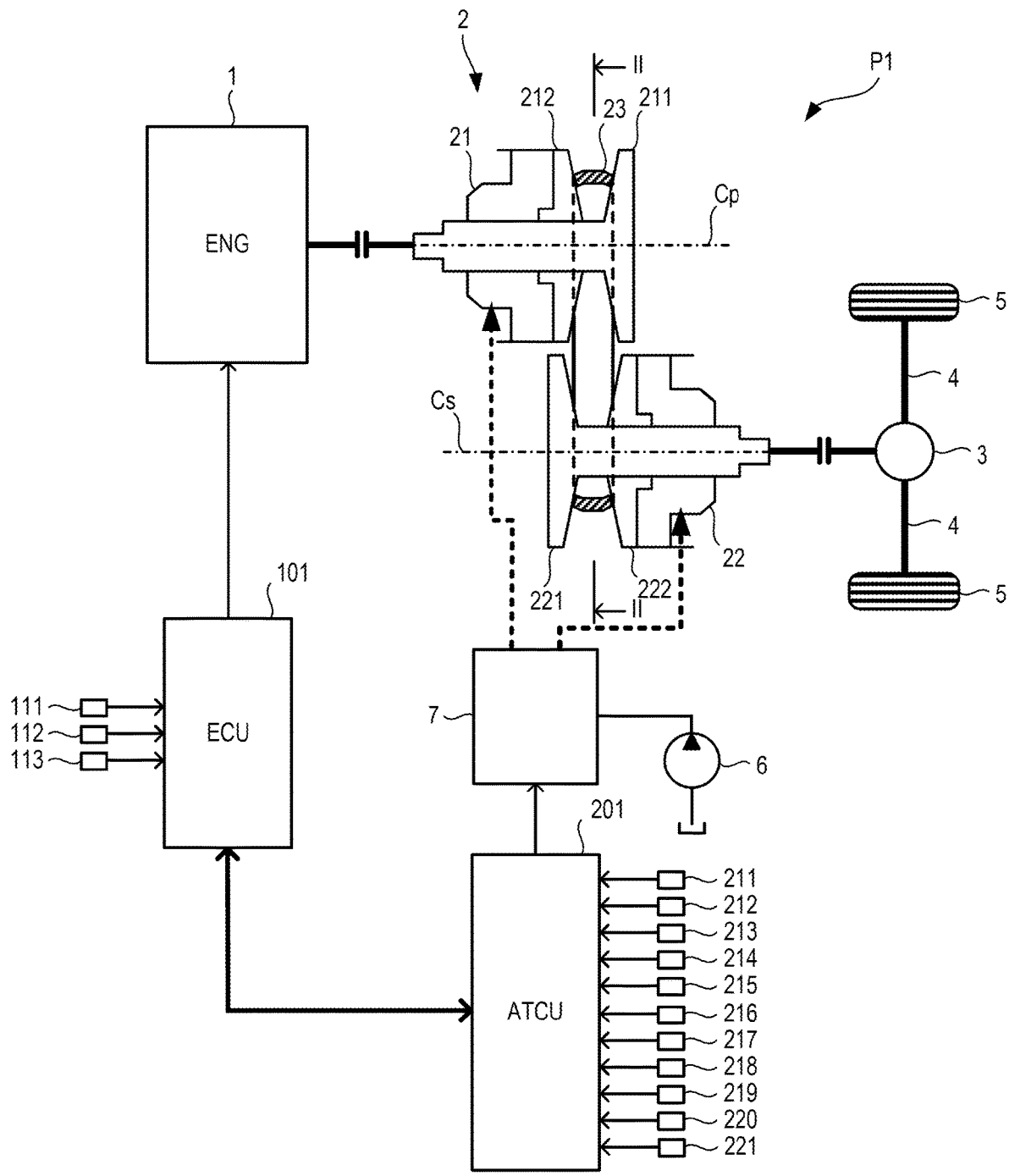
FIG. 1 is a schematic diagram illustrating a configuration of a power transmission system of a vehicle including a continuously variable transmission according to one embodiment of the present invention.

FIG. 1 schematically illustrates an overall configuration of a power transmission system (hereinafter referred to as a "drive system") P1 of a vehicle including a continuously variable transmission (CVT) 2 according to one embodiment of the present invention.

The driving system P1 according to the embodiment includes an internal combustion engine (hereinafter simply referred to as an "engine") 1 as a driving source of the vehicle, and includes the CVT 2 on a power transmission path coupling the engine 1 to left and right driving wheels 5, 5. The engine 1 and the CVT 2 can be coupled via a torque converter. The CVT 2 converts a rotative power input from the engine 1 at a predetermined speed ratio and outputs it to the driving wheels 5 via a differential gear 3.

The CVT 2 includes a primary pulley 21 at an input side and includes a secondary pulley 22 at an output side as a speed change component. The CVT 2 includes a metal belt 23 wound around the primary pulley 21 and the secondary pulley 22, and changing a ratio of a contact portion radius of the metal belt 23 on these pulleys 21, 22 ensures steplessly changing the speed ratio.

The primary pulley 21 and the secondary pulley 22 include fixed sheaves 211, 221, and movable sheaves 212, 222 disposed coaxially with respect to the fixed sheaves and movably in an axial direction along rotational center axes Cp, Cs (FIG. 2) of the fixed sheaves. The fixed sheave 211 of the primary pulley 21 is coupled to an input shaft of the CVT 2, and the fixed sheave 221 of the secondary pulley 22 is coupled to an output shaft. The speed ratio of the CVT 2 is controlled by adjusting a pressure of a hydraulic oil affecting the movable sheaves 212, 222 of the primary pulley 21 and the secondary pulley 22 and changing a width of a V groove formed between the fixed sheaves 211, 221 and the movable sheaves 212, 222.

In this embodiment, as a generation source of an operating pressure of the CVT 2, an oil pump 6 that uses the engine 1 or an electric motor (not illustrated) as a power source is disposed. The oil pump 6 raises the pressure of the hydraulic oil stored in a transmission oil pan, and using this as a source pressure, supplies the hydraulic oil at a predetermined pressure to hydraulic chambers of the movable sheaves 212, 222 via a hydraulic pressure control circuit 7. FIG. 1 illustrates a hydraulic pressure supply passage from the hydraulic pressure control circuit 7 to the hydraulic chambers by the dotted lines with the arrow.

The rotative power output from the CVT 2 is transmitted to driving shafts 4 via a final gear train set to a predetermined reduction gear ratio or a sub-transmission (neither of them is illustrated) and via the differential gear 3 to rotate the driving wheels 5.

Configuration and Basic Operation of Control System

Operations of the engine 1 and the CVT 2 are controlled by an engine controller 101 and a transmission controller 201, respectively. The engine controller 101 and the transmission controller 201 are both configured as an electronic control unit, and include a microcomputer including a central processing unit (CPU), various kinds of storage devices, such as a RAM and a ROM, input/output interfaces, and the like.

The engine controller 101 inputs detection signals of operating state sensors detecting an operating state of the engine 1, executes a predetermined calculation on the basis of the operating state, and sets a fuel injection amount, a fuel injection timing, an ignition timing, and the like of the engine 1. As the operating state sensors, an accelerator sensor 111 that detects an operation amount of an accelerator pedal by a driver (hereinafter referred to as an "accelerator pedal opening"), a rotation speed sensor 112 that detects a rotation speed of the engine 1, a cooling water temperature sensor 113 that detects a temperature of the engine cooling water, and the like are provided. Further, an air flow meter, a throttle sensor, a fuel pressure sensor, an air-fuel ratio sensor, and the like (not illustrated) are also provided. The engine controller 101 inputs the detection signals of these sensors.

The transmission controller 201 is coupled to the engine controller 101 in a communicable manner with one another via a bus with a CAN standard. Furthermore, relating to a control of the CVT 2, a vehicle speed sensor 209 that detects a vehicle travelling speed, an input side rotation speed sensor 210 that detects a rotation speed of the input shaft of the CVT 2, an output side rotation speed sensor 213 that detects a rotation speed of the output shaft of the CVT 2, an oil temperature sensor 214 that detects a temperature of the hydraulic oil of the CVT 2, a shift position sensor 215 that detects a position of a shift lever, and the like are provided. In this embodiment, in addition to the above, an acceleration sensor 216, a steering angle sensor 217, a suspension stroke sensor 218, a camera sensor 219, a laser sensor 220, a car navigation device 223, and the like are provided. The transmission controller 201 inputs information relating to an operating state of the engine 1, such as an accelerator pedal opening, from the engine controller 101, and inputs detection signals of these sensors.

The acceleration sensor 216 detects an acceleration rate (hereinafter referred to as a "lateral direction acceleration rate") affecting in the lateral direction on a vehicle body (that is, horizontal and a direction perpendicular to a straight-ahead direction of the vehicle). In this embodiment, an extending direction of the metal belt 23, in other words, a horizontal direction perpendicular to the rotational center axes Cp, Cs of the primary pulley 21 or the secondary pulley 22 corresponds to the straight-ahead direction of the vehicle, and a direction perpendicular to a circumferential direction and a radial direction of the metal belt 23 corresponds to the lateral direction of the vehicle. Accordingly, the lateral direction acceleration rate detected by the acceleration sensor 216 indicates a magnitude of an acceleration rate or a force (that is, an inertia force) affecting in the lateral direction on the metal belt 23 or the element as its power transmission medium.

The steering angle sensor 217 detects a steering angle of the vehicle. In this embodiment, a rotation angle with respect to a reference angular location of a steering wheel (that is, a steering angle of the steering wheel) is detected.

The suspension stroke sensor 218 is provided as means to detect a posture of the vehicle, and in this embodiment, it is configured of a pair of stroke sensors mounted on suspension devices on both left and right sides of front wheels or rear wheels. While in this embodiment, on the basis of a detection signal of the suspension stroke sensor 218 made of the pair of left and right stroke sensors, shaking in the lateral direction (hereinafter referred to as "rolling" in some cases) generated in the vehicle is determined, respective stroke sensors may be mounted on the left and right suspension devices of both the front wheels and the rear wheels as the suspension stroke sensor 218, and this ensures eliminating an influence of shaking or inclination in a front-rear direction on the determination of rolling. The suspension stroke sensor 218 can be embodied by a displacement sensor that detects a displacement of a piston rod disposed in a shock absorber and can also be embodied by an angular sensor that detects an angle of a suspension arm.

The camera sensor 219 is provided as means to detect a state of a road or a road surface on which the vehicle is currently travelling. Analyzing an image or a video taken by the camera sensor 219 ensures determining the presence/absence of unevenness of the road surface and their sizes as the state of the road or the road surface.

The laser sensor 220 is provided as means to detect a position shift of the element of the metal belt 23 with respect to a ring. In this embodiment, a relative movement in the lateral direction with respect to the ring is detected as the position shift of the element. The laser sensor 220 is disposed on a side where the position shift of the element is generated on the metal belt 23, and in this embodiment, it is disposed on both sides of the metal belt 23 due to the mounting method of the element.

The car navigation device 223 has road map information, as well as a GPS sensor built-in, and by matching a current location of the vehicle obtained by the GPS sensor (for example, an absolute position indicated by latitude and longitude) with the road map information, the position of the vehicle is detected on the road map. In this embodiment, the car navigation device 223 can be used as a substitute for the camera sensor 219 or complements this as another means to detect the state of the road or the road surface.

The transmission controller 201, as a basic control relating to speed change, determines a shift range selected by a driver on the basis of a signal from the shift position sensor 215 and sets a target speed ratio of the CVT 2 on the basis of an accelerator pedal opening, a vehicle speed, and the like. The transmission controller 201 outputs a control signal of the hydraulic pressure control circuit 7 such that a predetermined hydraulic pressure corresponding to the target speed ratio affects the movable sheaves 212, 222 of the primary pulley 21 and the secondary pulley 22 using the hydraulic pressure generated by the oil pump 6 as the source pressure.

Configuration of CVT 2

Figure 2:
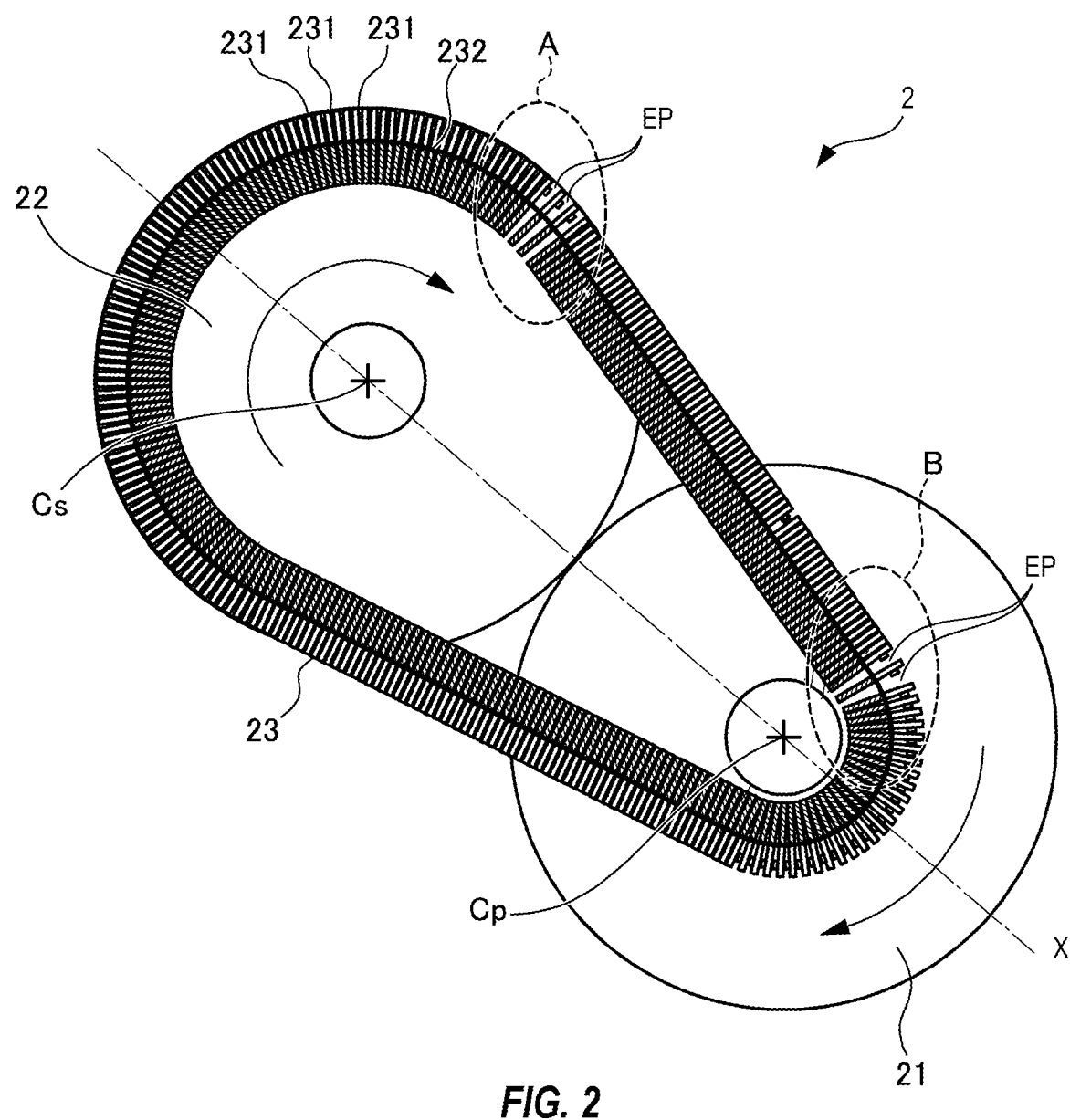
FIG. 2 is a cross-sectional view taken along II-II in FIG. 1.

FIG. 2 illustrates a configuration of the CVT 2 according to the embodiment in cross-section taken along the line II-II illustrated in FIG. 1.

In this embodiment, the CVT 2 includes the pair of variable pulleys, specifically, the primary pulley 21 and the secondary pulley 22, and the metal belt 23 wound around the pair of these pulleys 21, 22. Since FIG. 2 is a cross-section, FIG. 2 illustrates the movable sheave 212 of the primary pulley 21, the fixed sheave 221 of the secondary pulley 22, and the metal belt 23. The CVT 2 uses a push-belt, and the metal belt 23 is configured by arranging a plurality of elements 231 as power transmission media in its thickness direction and bundling them with one another with a ring 232 (referred to as a "hoop" or a "band" in some cases).

Figure 3:
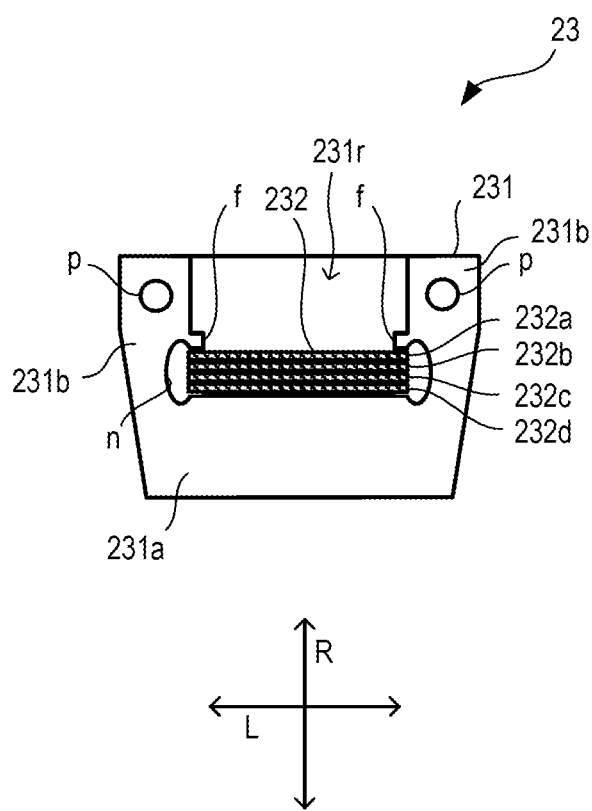
FIG. 3 is a cross-sectional view illustrating a configuration of a belt disposed in the continuously variable transmission.

FIG. 3 illustrates a configuration of the element 231 according to the embodiment in cross-section perpendicular in a circumferential direction of the metal belt 23.

In this embodiment, the ring 232 of the metal belt 23 is one ring configured by laminating a plurality of ring members 232a to 232d with one another (referred to as a "ring set" in some cases), and the plurality of elements 231 are mounted on this one ring or the ring set 232, and thus, the metal belt 23 is configured. Since the number of the ring 232 is one, the metal belt 23 according to the embodiment is referred to as a mono-ring metal belt or simply referred to as a "mono-belt" in some cases. While FIG. 3 illustrates the case where the ring members are four (232a to 232d), it is needless to say that the number of the ring members is not limited to this.

The element 231, in general, is configured of a base portion 231a and a pair of side portions 231b, 231b extending perpendicularly in an extending direction of the base portion 231a and in the same direction with one another, and forms an approximate U shape as a whole in this embodiment. The base portion 231a is also referred to as a saddle portion, has a length enough to cross the ring 232, and has both ends on which contact surfaces with the respective sheaves 211, 212, 221, 222 of the primary pulley 21 and the secondary pulley 22 are formed. The extending direction of the base portion 231a is a width direction of the element 231 and corresponds to a lateral direction L of the metal belt 23. The side portions 231b are also referred to as pillar portions, the respective sides sandwiching the ring 232 are coupled to the base portion 231a, and their extending direction is a height direction of the element 231 and corresponds to a radial direction R of the metal belt 23. Inner surfaces of the pair of these side portions 231b, 231b that are facing one another and a top surface of the base portion 231a form a receiving portion 231r of the element 231 that opens in a direction perpendicular to the lateral direction L, that is, in the radial direction R of the metal belt 23. In this embodiment, the direction in which the receiving portion 231r opens is outward with respect to the radial direction R of the metal belt 23. The element 231 is mounted on the ring 232 from the inner peripheral side of the metal belt 23 with the ring 232 received by the receiving portion 231r.

The element 231 has hooks or clamping pieces f that inwardly project from the insides on the respective left and right side portions 231b forming the receiving portion 231r, and the ring 232 is held between the base portion 231a and these hooks f while being mounted on the ring 232. The element 231 has a pair of cutouts n on both left and right side portions 231b, 231b, and the pair of cutouts n partially extend a space of the receiving portion 231r in the lateral direction L. The cutout n is to provide flexibility to the hook f to give a force to press the ring 232 and to form the space for the ring 232 to escape when the element 231 is mounted.

Figure 4A:
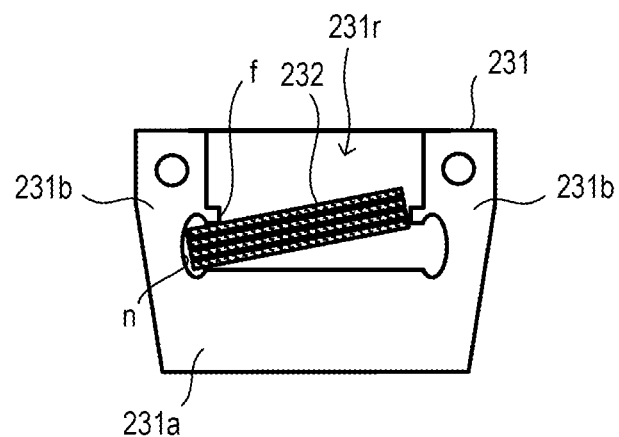
FIG. 4A is an explanatory drawing illustrating a method for assembling the belt (a mounting procedure of elements).
Figure 4B:
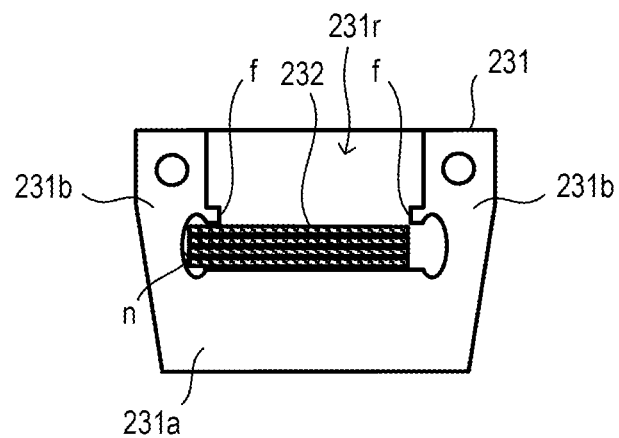
FIG. 4B is an explanatory drawing illustrating the method for assembling the belt (the mounting procedure of elements).
Figure 4C:
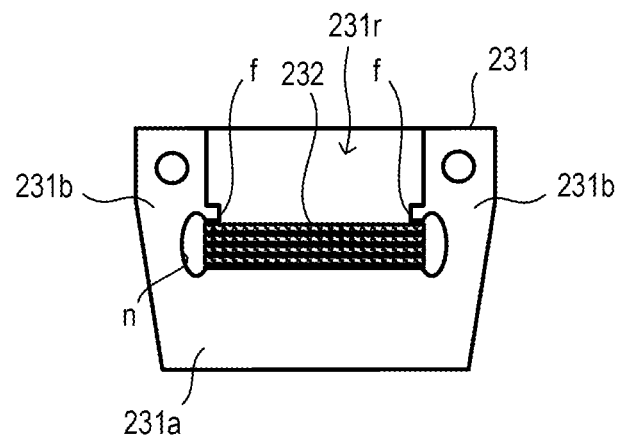
FIG. 4C is an explanatory drawing illustrating the method for assembling the belt (the mounting procedure of elements).

FIGS. 4A to 4C illustrate a method for assembling the metal belt 23, specifically, a mounting procedure of the element 231 on the ring 232 in time series. While FIGS. 4A to 4C illustrate the procedure by changing the posture of the ring 232 for ease of illustration and understanding, it is needless to say that, in the actual mounting, the orientation of the element 231 is changed.

First, with being inclined with respect to the ring 232, the element 231 is arranged on an inner peripheral side of the ring 232, and one side edge of the ring 232 is inserted into the receiving portion 231r of the element 231. Then, the element 231 is moved so as to bring the base portion 231a close to the ring 232, and as illustrated in FIG. 4A, the side edge of the ring 232 is brought to reach the cutout n through a space between the base portion 231a and the hook (in the state illustrated in FIG. 4A, the hook disposed on the side portion 231b on the left side) f disposed on the side portion 231b on one side.

Next, as illustrated in FIG. 4B, the element 231 is rotated about a portion of the ring 232 positioned between the base portion 231a and the hook f (in the state illustrated in FIG. 4B, rotated in an opposite direction of clockwise) to eliminate the inclination of the element 231 with respect to the ring 232. In this state, the element 231 has the base portion 231a parallel to the ring 232.

After the base portion 231a of the element 231 is rendered to be parallel to the ring 232, as illustrated in FIG. 4C, the element 231 is relatively moved in a direction in which the side edge of the ring 232 is taken out of the cutout n with respect to the ring 232 (in the state illustrated in FIG. 4C, the element 231 is moved to the left side) to arrange the ring 232 at the center of the base portion 231a. This completes mounting one element 231.

Repeating such a procedure for all the elements 231 across the whole circumference of the metal belt 23 completes the metal belt 23. The tensile force of the ring 232, and furthermore, an engagement of a projecting portion p (FIG. 3) provided on a front surface of the element 231 with a depressed portion provided on a rear surface of the adjacent element 231 cause the anterior-posterior elements 231 to be bundled with one another.

Here, in the CVT 2 using the elements 231 as the power transmission medium, there may be a case where the end play as the gap between the adjacent elements 231 widens to increase the total quantity of the end plays over the whole circumference of the metal belt 23. Specifically, it is a case where an extension caused by an elastic or plastic deformation is generated in the ring 232 bundling the elements 231 and a case where the element 231 is pressed by another element 231 to be collapsed or the elements 231 are rubbed with one another to be abraded.

When the end plays locally concentrate in such a state, and furthermore, the force in the direction perpendicular to the circumferential direction and the radial direction of the metal belt 23 (that is, the lateral direction) is applied to the element 231, the element 231 moves in the lateral direction with respect to the ring 232. Accordingly, it is concerned that the element 231 falls off of the ring 232 in a reversed procedure of the procedure described prior with reference to FIGS. 4A to 4C.

Figure 5:
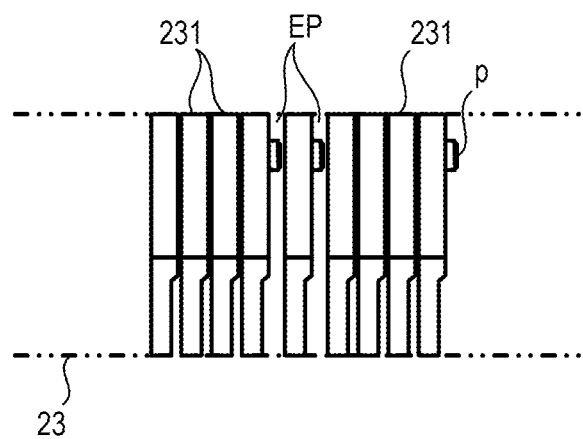
FIG. 5 is an explanatory drawing schematically illustrating a state where end plays concentrate.

FIG. 2 illustrates an end play concentrated state (end plays EP), and FIG. 5 schematically illustrates a portion of the metal belt 23 at which the end plays EP concentrate in an enlarged view for ease of understanding.

In this embodiment, the element 231, specifically, a direction in which the receiving portion 231r of the element 231 opens is outward with respect to the radial direction R of the metal belt 23, and therefore, in a part of the metal belt 23 where the receiving portion 231r of the element 231 points downward with respect to a vertical direction, in other words, a part in a lower side with respect to a straight line X connecting a rotational center axis Cp of the primary pulley 21 and a rotational center axis Cs of the secondary pulley 22, the fall-off of the element 231 is suppressed even if the end play EP is generated. In contrast to this, in a part where the receiving portion 231r points upward, there is a possibility of the fall-off.

Furthermore, in an upper side portion of the metal belt 23, the end play EP tends to be generated in ranges A and B illustrated in FIG. 2 due to the force applied from the pulleys 21, 22 to the metal belt 23. Here, the ranges A, B are divided into a case where the elements 231 advance in a direction to be sandwiched between the pulleys 21, 22, in other words, a case where the metal belt 23 advances in a direction to enter into a space between the pulleys 21, 22 and a case where the metal belt 23 advances in a direction to get out of the space between the pulleys 21, 22, corresponding to a direction in which the pulleys 21, 22 rotate. When the metal belt 23 advances in the entering direction (in the example illustrated in FIG. 2, the range B), the element 231 is to be sandwiched between the pulleys 21, 22 even though the end play EP is generated, and therefore, the fall-off is suppressed. On the other hand, when the metal belt 23 advances in the getting-out direction (the range A), a support by the pulleys 21, 22 is not provided, and therefore, the element 231 possibly falls off when the end play EP is generated, and a countermeasure is necessary.

In this embodiment, when a position shift or a relative movement in the lateral direction with respect to the ring 232 is generated in the element 231, or when an action of a force that generates such a position shift is present on the element 231, a predetermined control (hereinafter referred to as a "falling-off suppressing control") for suppressing the element 231 from falling off of the ring 232 is executed. The falling-off suppressing control is embodied as a control that avoids an operation of the vehicle or the CVT 2 under a condition in which a widening or a concentration of the end plays is generated or that suppresses the position shift of the element 231 in a further direct method. In this embodiment, it is embodied by reducing the torque of the engine 1 to less than that in the operation by a usual control to reduce the torque input to the primary pulley 21. The falling-off suppressing control is a control corresponding to the "falling-off countermeasure control."

Figure 6:
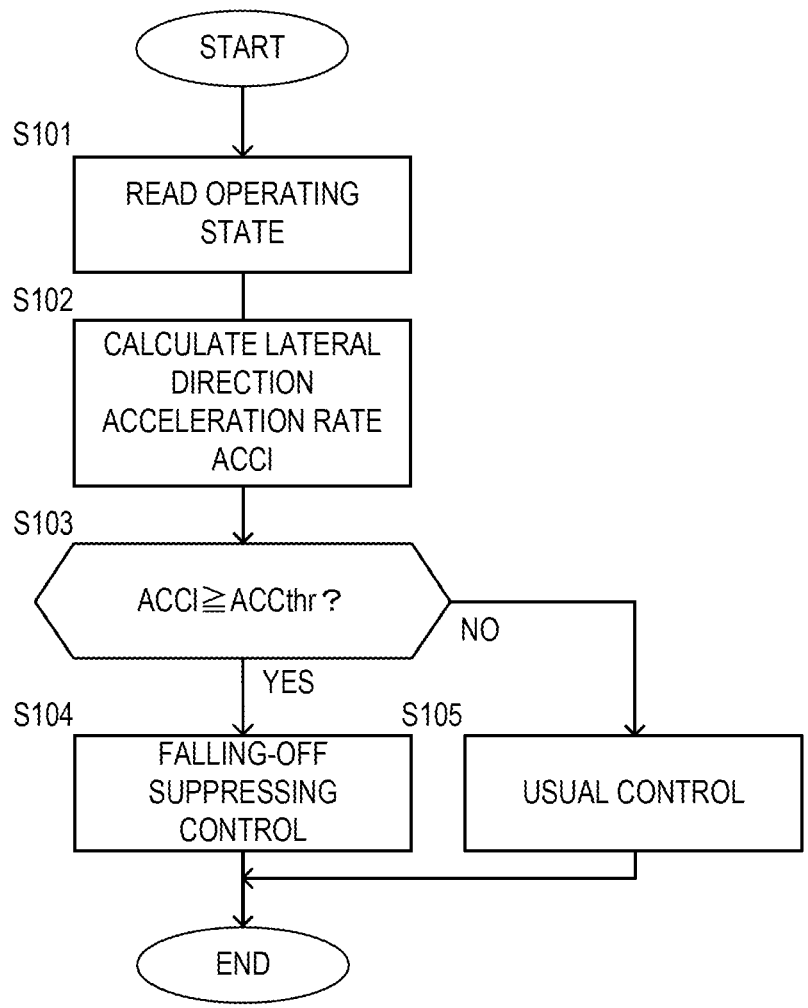
FIG. 6 is a flowchart illustrating a basic procedure of a falling-off countermeasure control according to one embodiment of the present invention.

FIG. 6 illustrates a basic procedure of the falling-off suppressing control according to the embodiment in a flowchart.

In this embodiment, the falling-off suppressing control is executed by the transmission controller 201, and the transmission controller 201 is programmed to execute a control routine illustrated in FIG. 6 at a predetermined period. Not limited by the transmission controller 201, the falling-off suppressing control may be executed by the engine controller 101 or may be executed by another controller other than them.

At S101, an operating state of the vehicle is read. In this embodiment, as the operating state relating to the falling-off suppressing control, a steering angle Astr and a vehicle speed VSP are read.

At S102, on the basis of the steering angle Astr and the vehicle speed VSP, a lateral direction acceleration rate ACCl of the vehicle is calculated. The calculation of the lateral direction acceleration rate ACCl is performed by calculating a turning radius φtrn of the vehicle from the steering angle Astr and assigning the turning radius φtrn and the vehicle speed VSP in the following formula (1). As described above, because of the arrangement of the CVT 2, the lateral direction acceleration rate ACCl is an acceleration rate affecting the metal belt 23 and the element 231 in the lateral direction, and specifies a magnitude of a force affecting the element 231 in the same direction.

$$VSP/\varphi trn = ACCl \qquad (1)$$

At S103, it is determined whether the lateral direction acceleration rate ACCl is equal to or more than a predetermined value ACCthr or not. When the lateral direction acceleration rate ACCl is equal to or more than the predetermined value ACCthr, the procedure proceeds to S104, and when the lateral direction acceleration rate ACCl is less than the predetermined value ACCthr, the procedure proceeds to S105.

At S104, the falling-off suppressing control is executed since an action of a force that generates a position shift in the lateral direction with respect to the ring 232 is present given that the end plays widen and concentrate for the elements 231 (the situation like this is hereinafter expressed as "the action of the force in the lateral direction is present on the element" for short in some cases). In this embodiment, in order to avoid the operation of the CVT 2 under a condition where the end play widens to have a tendency of increasing the total quantity of the end plays over the whole circumference of the metal belt 23, the operating state of the CVT 2 is changed. Specifically, reducing the torque of the engine 1 to less than that in the operation by the usual control reduces the torque input to the primary pulley 21.

At S105, the falling-off suppressing control is not performed, and the usual control is maintained.

In this embodiment, the transmission controller 201 configures a "controller" of the CVT 2.

Description Of Operational Advantage

The CVT 2 according to the embodiment and the drive system P1 including the CVT 2 are configured as described above, and the following describes the effect obtained by this embodiment.

First, when it is detected that the action of the force that generates the position shift in the lateral direction with respect to the ring 232 (the force in the lateral direction on the element 231) is present on the element 231 of the metal belt 23, executing the falling-off suppressing control ensures suppressing the element 231 from falling off of the ring 232.

Here, as the falling-off suppressing control, the torque of the engine 1 is reduced to less than that in the operation by the usual control, and thus, the widening of the end play is suppressed with a comparatively simple method, thereby ensuring suppressing the fall-off of the element 231. This is because, without the widening of the end play, a gap that would cause the element 231 to fall off is not generated even if it is under the condition in which the end plays concentrate.

Second, as the falling-off suppressing control, reducing the torque of the engine 1 reduces the torque input to the primary pulley 21, and thus ensuring a reduced collapse by compression of the element 231 to ensure effectively suppressing the widening of the end play.

Third, as the operating state relating to the falling-off suppressing control, detecting the steering angle Astr and the vehicle speed VSP determines that the action of the force in the lateral direction is present on the element 231 using the sensor already disposed in the vehicle to ensure executing the falling-off suppressing control.

In this embodiment, the steering angle Astr is detected, and the calculation based on this detects the lateral direction acceleration rate ACCl. However, the detection of the lateral direction acceleration rate ACCl is not limited to this, and it can be detected by an output value of the acceleration sensor 216. This further directly detects the lateral direction acceleration rate ACCl to ensure achieving reduced calculation load.

Furthermore, while in this embodiment, the turning radius φtrn of the vehicle is calculated from the steering angle Astr and the lateral direction acceleration rate ACCl is calculated from the turning radius φtrn and the vehicle speed VSP, by employing a curvature radius of the road instead of the turning radius φtrn of the vehicle, the lateral direction acceleration rate ACCl may be calculated similarly to the case by the turning radius φtrn using the curvature radius and the vehicle speed VSP. This predicts that the action of the force in the lateral direction is present on the element 231 to ensure executing the falling-off suppressing control at a further appropriate timing. For example, before the vehicle enters the road with a large curvature radius, the torque of the engine 1 is reduced to ensure suppressing the widening of the end play in advance. The curvature radius of the road can be obtained from the car navigation device 223 as navigation information accompanying the road map information.

In the above description, it is determined whether the action of the force in the lateral direction is present or not on the element 231 on the basis of the lateral direction acceleration rate ACCl. However, this determination is not only by the lateral direction acceleration rate ACCl, but also can be performed by determining the presence/absence of the rolling of the vehicle body and its magnitude.

Figure 7:
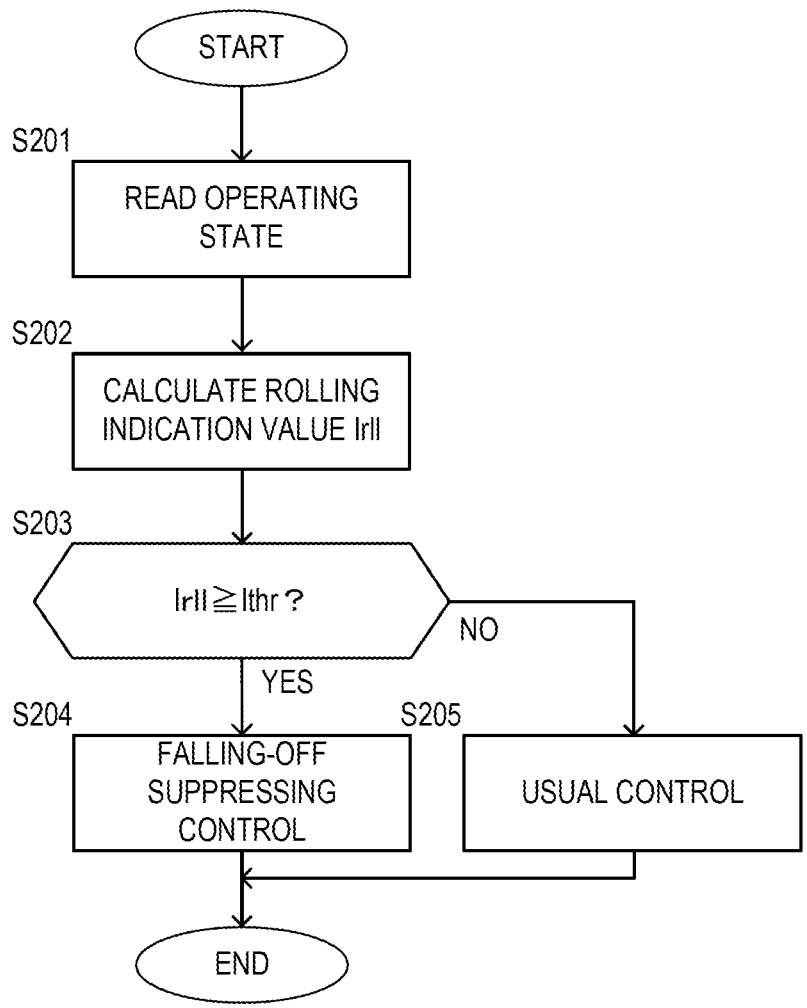
FIG. 7 is a flowchart illustrating a procedure of a modification of the falling-off countermeasure control according to the embodiment.

FIG. 7 illustrates a procedure of a modification of the falling-off suppressing control according to the embodiment in a flowchart as an example of this case.

At S201, as the operating state of the vehicle relating to the falling-off suppressing control, stroke amounts STRr, STRl of the suspension device disposed in the front wheel or the rear wheel are read. Specifically, suspension stroke amounts of a right front wheel and left front wheel or suspension stroke amounts of a right rear wheel and left rear wheel are detected. The suspension stroke amounts STRr, STRl are detected by the suspension stroke sensor 218. As described above, left and right suspension stroke amounts STRfr, STRfl, STRrr, STRrl of both the front wheels and the rear wheels may be detected.

At S202, a rolling indication value Irll is calculated on the basis of the suspension stroke amounts STRr, STRl. The rolling indication value Irll is an indicator that indicates a magnitude of shaking in the lateral direction generated in the vehicle body, and indicates that the larger this is, the larger the rolling is. In this embodiment, a difference (=ΔSTRr−ΔSTRl) between an amount of change per unit time of the suspension stroke amount STRr on the right side (hereinafter referred to as a "suspension stroke changing amount") ΔSTRr and a suspension stroke changing amount on the left side ΔSTRl is calculated, and this stroke changing amount deviation Dstr is set as the rolling indication value Irll.

At S203, it is determined whether the rolling indication value Irll is equal to or more than a predetermined value Ithr or not. When the rolling indication value Irll is the predetermined value Ithr or more, the procedure proceeds to S204, and when the rolling indication value Irll is less than the predetermined value Ithr, the procedure proceeds to S205.

At S204, the falling-off suppressing control is executed as the rolling is large and the action of the force that generates the position shift in the lateral direction with respect to the ring 232 is present on the element 231. Similarly as mentioned above, reducing the torque of the engine 1 to less than that in the operation by the usual control reduces the torque input to the primary pulley 21 to suppress the widening of the end play.

At S205, the falling-off suppressing control is not executed, and the usual control is maintained.

Thus, by determining the magnitude of rolling generated in the vehicle body, when the rolling is large and the action of the force that generates the position shift in the lateral direction is present on the element 231, the falling-off suppressing control (for example, reducing the torque of the engine 1) is executed. Thus, the presence/absence of the action of the force caused by the state of the road or the road surface on which the vehicle is currently travelling is determined, and thereby, for example, when the action of the force by the unevenness of the road surface is present, ensuring suppressing the element 231 from falling off of the ring 232.

The employment of the suspension stroke amounts STRr, STRl for calculating the rolling indication value Irll indicating the magnitude of the rolling ensures detecting the rolling generated in the vehicle body with more certainty to ensure suppressing the fall-off of the element 231.

The state of the road or the road surface can also be determined by analyzing an image or a video taken by the camera sensor 219. This ensures predicting that the action of the force in the lateral direction is present on the element 231 before the vehicle actually travels on the road or the road surface generating the rolling to execute the falling-off suppressing control at a further appropriate timing.

Furthermore, the state of the road or the road surface can be determined by navigation information obtained from the car navigation device 223, not only by the camera sensor 219. For example, when there is a road under construction in a travelling direction of the vehicle or there is a road with continuous unevenness or ups and downs on the road surface, it is predicted that the action of the force in the lateral direction is present on the element 231.

In the above description, it is determined if, on the element 231, the action of the force that generates the position shift in the lateral direction with respect to the ring 232 is present on the basis of the lateral direction acceleration rate ACCl or the rolling indication value Irll, and when such an action of the force is present on the element 231, the falling-off suppressing control is executed. However, the determination of whether the falling-off suppressing control is executed or not is, not limited by determining the presence/absence of the action of the force on the element 231, but also possible by determining whether the position shift in the lateral direction with respect to the ring 232 is generated on the element 231 or not. When such a position shift is actually generated on the element 231, the falling-off suppressing control is executed.

Figure 8:
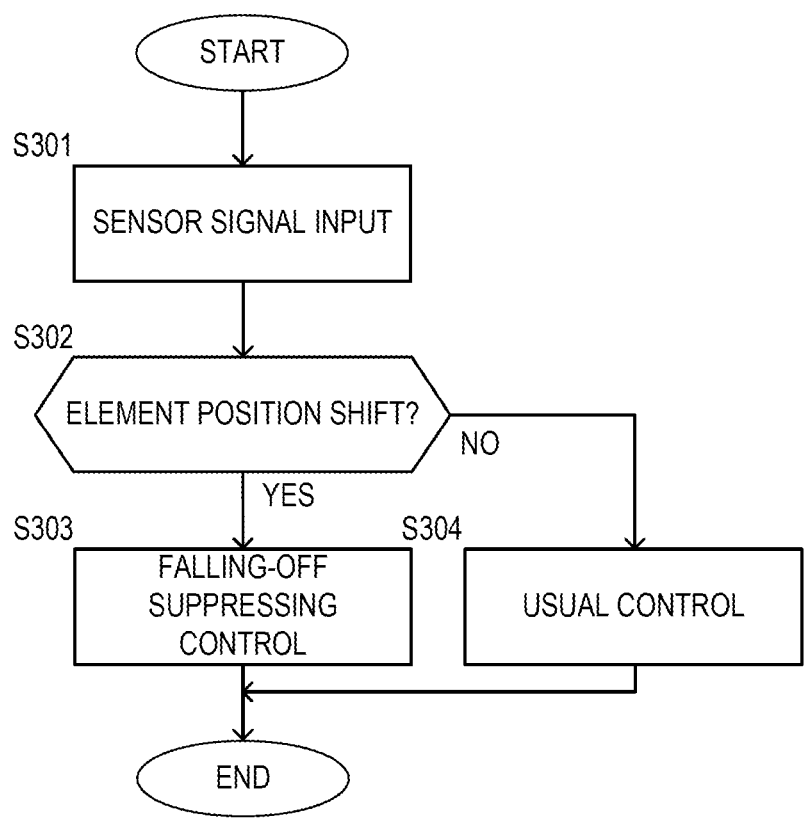
FIG. 8 is a flowchart illustrating a procedure of another modification of the falling-off countermeasure control according to the embodiment.

FIG. 8 illustrates a procedure of another modification of the falling-off countermeasure control according to the embodiment in a flowchart as an example of this case.

At S301, a signal of the laser sensor 220 is input. The laser sensor 220 is provided as means to detect the position shift of the element 231, and is surely possible to be substituted by other means that can detect the position shift of the element 231.

At S302, it is determined whether the position shift in the lateral direction with respect to the ring 232 is generated on the element 231 or not. When the position shift is generated on the element 231, the procedure proceeds to S303, and when no position shift is generated, the procedure proceeds to S304.

Figure 9A:
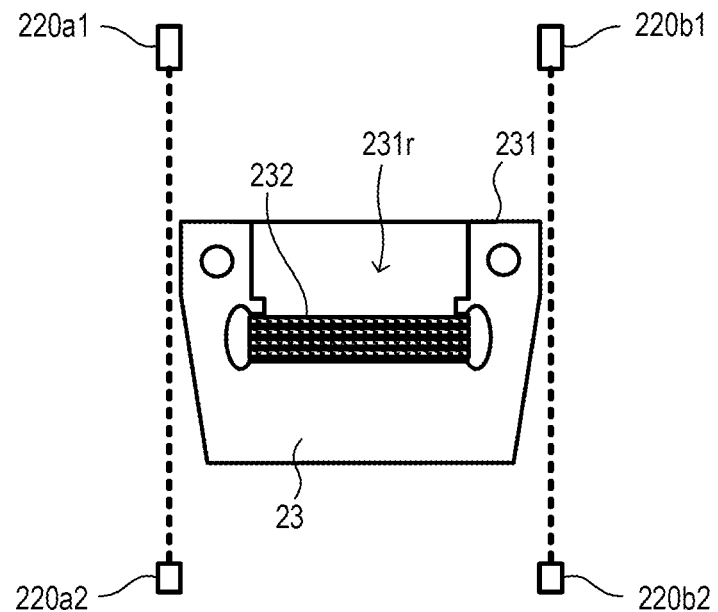
FIG. 9A is an explanatory drawing illustrating a position shift detection method of the element using a laser sensor.
Figure 9B:
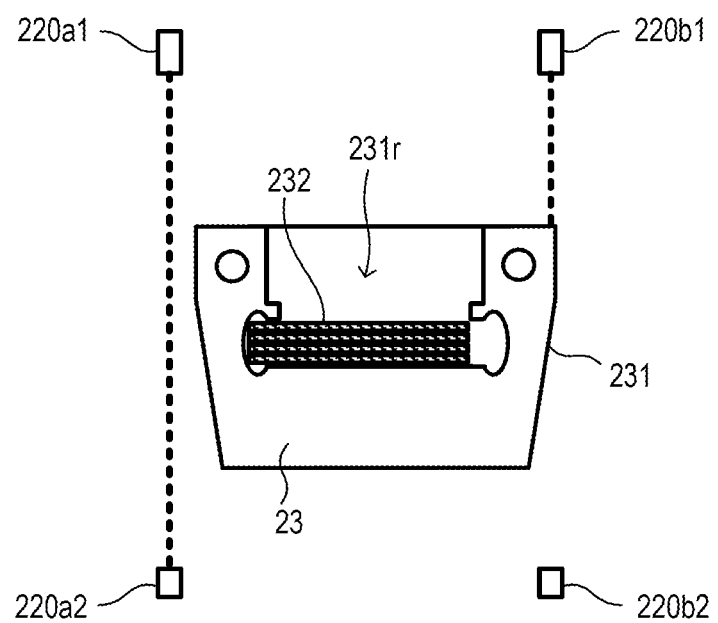
FIG. 9B is an explanatory drawing illustrating the position shift detection method of the element using the laser sensor.

FIGS. 9A and 9B illustrate an operation of arranging the laser sensor 220 and detecting a position shift of the element 231 by the laser sensor 220. FIG. 9A illustrates a state before the position shift is generated on the element 231, and FIG. 9B illustrates a state after the position shift is generated.

In this embodiment, laser sensors 220a, 220b are arranged on both sides of the metal belt 23, and the laser sensors 220a, 220b are made of light emitting portions 220a1, 220b1 and light receiving portions 220a2, 220b2. When a position shift equal to or more than a specified value is generated on the element 231, lasers radiated from the light emitting portions 220a1, 220b1 are obstructed by the element 231, and thus, the generation of the position shift is detected.

At S303, as the falling-off suppressing control, the torque of the engine 1 is reduced to less than that in the operation by the usual control.

At S304, the falling-off suppressing control is not executed, but the usual control is maintained.

Thus, determining whether the position shift of the element 231 is generated or not, and when the position shift is actually generated, executing the falling-off suppressing control ensure avoiding an unnecessary execution of the falling-off suppressing control to reduce an influence on vehicular drivability (for example, a decreased acceleration responsivity).

Here, using the laser sensor 220 for detecting the position shift of the element 231 ensures reliably detecting the position shift of the element 231 with a comparatively simple method.

Description Of Other Embodiments

Figure 10:
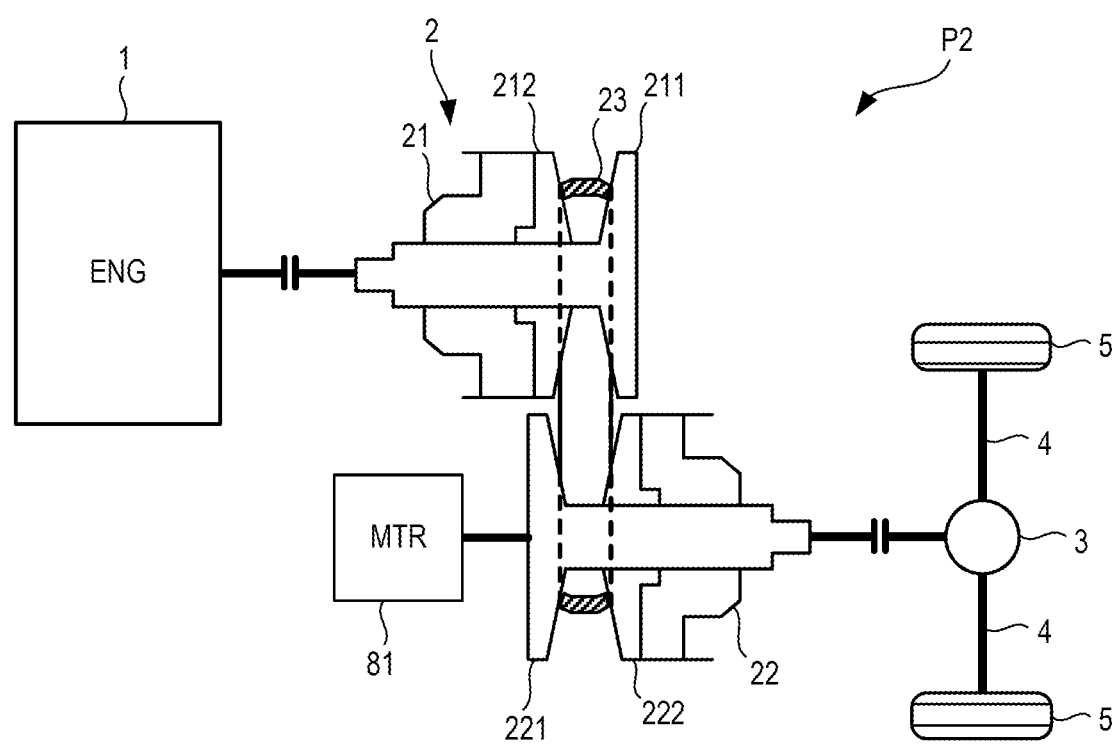
FIG. 10 is a schematic diagram illustrating a configuration of a power transmission system of a vehicle according to another embodiment of the present invention.

FIG. 10 schematically illustrates an overall configuration of the driving system P2 of a vehicle according to another embodiment of the present invention.

In this embodiment, as a driving source of the vehicle, an electric motor 81 as a second driving source is included in addition to the engine 1 as the first driving source. The electric motor 81 is a motor-generator configured to operate as an electric generator and as a motor, and is provided to transmit a power to the driving wheels 5, 5 without via the CVT 2. Here, "without via the CVT 2" means without speed change by the CVT 2, and includes, not limited to the case where the electric motor 81 is arranged between the CVT 2 and the driving wheels 5, 5 on a power transmission path coupling the engine 1 to the driving wheels 5, 5, but also the case where the electric motor 81 is connected to the output shaft of the secondary pulley 22 so as to substantially be on a power transmission path in a downstream side with respect to the CVT 2. FIG. 10 illustrates the latter example.

The falling-off suppressing control according to the embodiment is embodied as the control that increases the torque of the electric motor 81 when the position shift in the lateral direction with respect to the ring 232 is generated on the element 231 or the action of the force that generates such a position shift on the element 231 is present.

Thus, increasing the torque of the electric motor 81 ensures reducing the torque that is assigned to the engine 1 in the torque necessary to achieve a requested acceleration rate of the vehicle, in other words, the torque input to the primary pulley 21 to suppress the widening of the end play.

Figure 11:
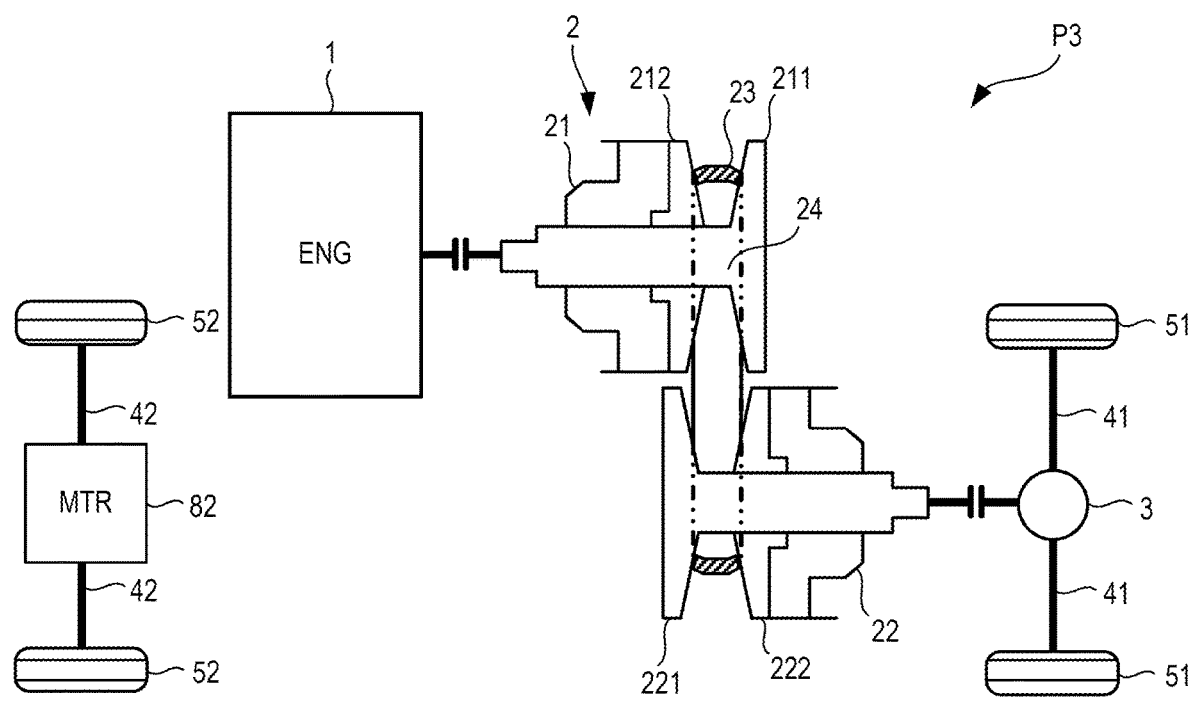
FIG. 11 is a schematic diagram illustrating a configuration of a power transmission system of a vehicle according to yet another embodiment of the present invention.

FIG. 11 schematically illustrates an overall configuration of a driving system P3 of a vehicle according to yet another embodiment of the present invention.

The driving system P3 according to the embodiment is different from the driving system P2 according to the prior embodiment in that an electric motor 82 as a second driving source is provided to transmit a power, not to first driving wheels 51, 51 that receive the transmission of the power from the engine 1, but to second driving wheels 52, 52 different from the first driving wheels 51, 51. Here, the electric motor 82 is in the state of being adapted to transmit the power to the driving wheels (that is, the first driving wheels) 51, 51, without via the CVT 2, similarly to the electric motor 81 of the driving system P2.

The falling-off suppressing control according to the embodiment is also similar to the prior embodiment. Specifically, the torque of the electric motor 82 is increased to reduce a proportion or a distribution that the engine torque occupies with respect to the requested driving torque, and through the reduced torque input to the primary pulley 21, it is possible to suppress the widening of the end play.

The falling-off suppressing control may be increasing a pressure of the hydraulic oil of the CVT 2 that generates a pulley thrust to more than that in the operation by the usual control, not limited to reducing the torque of the engine 1, in other words, reducing the input torque to the primary pulley 21.

This increases the tensile force of the ring 232 and reduces the torque assigned to the element 231 in the torque transmitted by the belt 23 to suppress the collapse of the element 231, thereby ensuring suppressing the widening of the end play. While the increased tensile force accelerates the extension of the ring 232, suppressing the collapse of the element where an influence on the widening of the end play further significantly appears ensures suppressing the widening of the end play not by way of the reduction of the engine torque.

Furthermore, the falling-off suppressing control can be embodied, not only by the change of the operating state of the CVT 2, but also by spraying a lubricating oil of the CVT 2 to the part where the concentration of the end plays is generated (the part in the range A indicated by the dotted line in FIG. 2) in the metal belt 23.

Figure 12:
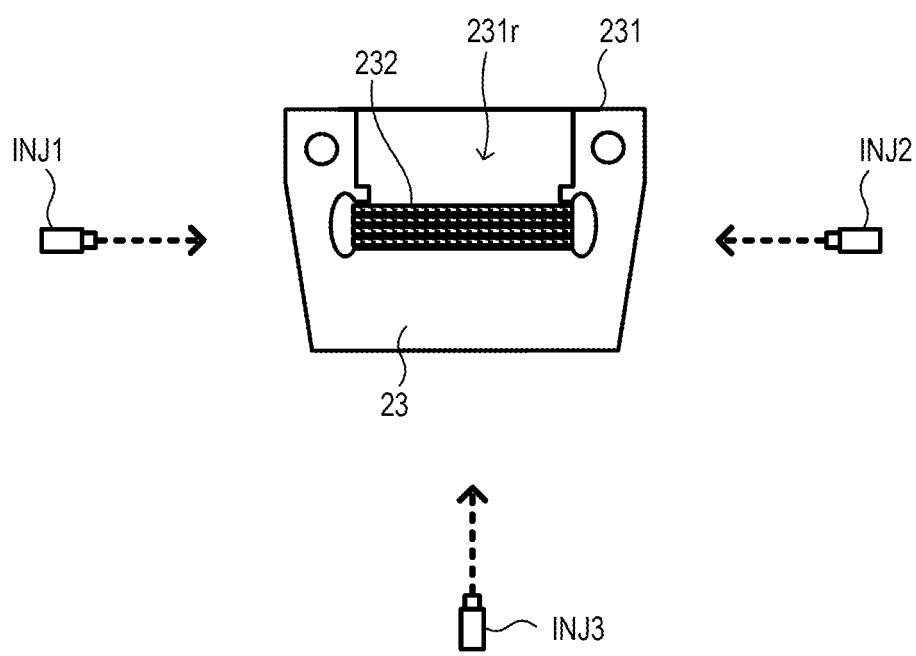
FIG. 12 is an explanatory drawing illustrating a falling-off suppressing method of the element by spraying a lubricating oil.

FIG. 12 schematically illustrates the falling-off suppressing control when the lubricating oil is sprayed.

A plurality of oil injectors INJ1 to INJ3 are arranged so as to ensure injecting the lubricating oil of the CVT 2 to the metal belt 23. In this embodiment, three oil injectors INJ1 to INJ3 are disposed. The oil injectors INJ1, INJ2 are disposed at positions from which the lubricating oil is sprayed to the element 231 in the opposite direction of the direction in which the position shift is generated. The oil injector INJ3 is disposed at a position from which the lubricating oil is sprayed in the opposite direction of the direction in which the receiving portion 231r opens. The pressure of the lubricating oil sprayed to the element 231 from a side portion by the oil injectors INJ1, INJ2 suppresses the position shift itself of the element 231, and the pressure of the lubricating oil sprayed from a lower side by the oil injector INJ3 supports the element 231, thereby ensuring suppressing the fall-off from the ring 232.

Here, when the lubricating oil is already supplied by any one of the oil injectors INJ1 to INJ3, the falling-off suppressing control may be increasing the supply amount by the oil injector.

While in the above description, the falling-off suppressing control is constantly executed when the action of the force that generates the position shift in the lateral direction with respect to the ring 232 is present on the element 231, it is not limited to this, and whether the end play of the metal belt 23 widens or is in a preliminarily determined condition as a condition of concentration or not is determined, and only when it is in such a condition, the falling-off suppressing control may be executed. This avoids an unnecessary execution of the falling-off suppressing control, thereby ensuring a reduced influence of the falling-off suppressing control on the vehicular drivability, such as the reduced engine torque.

Whether the end play is in the widening condition or not can be determined from the torque of the engine 1, and whether the end plays are in the concentrating condition or not can be determined from the travelling condition of the vehicle. The end play concentrating condition can be exemplified as a travelling condition of a vehicle travelling on a slope road is in an end play generation region preliminarily determined with respect to an accelerator pedal opening and a vehicle speed. The end play generation region can be set by solving an equation of motion relating to a balance of force applied to the metal belt 23, and determining whether a force enough to generate the end play EP is applied to the target elements 231 (specifically, the elements in the range A illustrated in FIG. 2) in a direction to separate the adjacent elements 231 or not.

Furthermore, not only by the determination of whether it is in the end play concentrating condition or not, it is also possible to execute the falling-off suppressing control when the concentration of end plays is actually generated by installing an end play sensor that can detect the concentration of the end plays. As a sensor applicable to the end play sensor, an eddy current sensor can be exemplified besides an optical sensor, such as a laser sensor. The end play sensor is installed at a position where the end plays concentrate (for example, the part in the range A indicated by the dotted line in FIG. 2), and the concentration of end plays is detected from its signal waveform.

In addition to the above, the direction in which the receiving portion 231r opens in the state where the element 231 is mounted on the ring 232 may be to an outer peripheral side (that is, outside in a radial direction) of the metal belt 23 or may be to an inner peripheral side (inside in the radial direction). When the receiving portion 231r opens to the inside in the radial direction of the metal belt 23, the direction in which the lubricating oil is sprayed by the oil injector INJ3 is opposite of the direction illustrated in FIG. 12 when the fall-off of the element 231 is suppressed by spraying the lubricating oil.

Furthermore, the "lateral direction" specified for the metal belt 23 is not limited to the direction perpendicular to a straight-ahead direction, that is, a front-rear direction of a vehicle, but may be the straight-ahead direction of the vehicle. In this case, an extending direction of the metal belt 23 is in a relation perpendicular to the straight-ahead direction of the vehicle, and a direction parallel to the rotational center axis Cp, Cs of the pulleys 21, 22 corresponds to the straight-ahead direction of the vehicle.

In the above description, the first driving source and the second driving source which can transmit the power to the driving wheels 5, 5 without via the CVT 2 are provided, and the engine 1 is employed as the first driving source and the electric motors 81, 82 are employed as the second driving source. However, the first driving source can be configured of, not only the internal combustion engine, but an electric motor (for example, a motor-generator) or a combination of the internal combustion engine and the electric motor.

While the embodiments of the present invention have been described above, the present invention is not limited to these, and it is needless to say that various changes and modifications can be made within a range of the matter disclosed in claims.

The present application claims a priority of Japanese Patent Application No. 2019-70606 filed with the Japan Patent Office on Apr. 2, 2019, all the contents of which are hereby incorporated by reference.

The invention claimed is:

1. A continuously variable transmission mounted on a vehicle, comprising:
 a primary pulley;
 a secondary pulley;
 a belt wound around the primary pulley and the secondary pulley, the belt including:
  a ring; and a plurality of elements bundled by the ring, the elements having respective receiving portions opening in a radial direction of the belt, the elements receiving the ring in the receiving portions; and a controller configured to:
assuming a direction perpendicular to a circumferential direction and a radial direction of the belt as a lateral direction, detect a relative movement of an element of the plurality of elements in the lateral direction with respect to the ring or detect a presence of an action of a force in the lateral direction on an element of the plurality of elements; and execute a preliminarily determined falling-off countermeasure control of an element of the plurality of elements when the relative movement of an element of the plurality of elements is detected or the action of the force on an element of the plurality of elements is detected.

2. The continuously variable transmission according to claim 1, wherein
the controller is further configured to detect the presence of the action of the force based on an acceleration rate of the vehicle, an acceleration rate of the belt or an acceleration rate of the element of the plurality of elements detected by an acceleration sensor.

3. The continuously variable transmission according to claim 1, wherein
the controller is further configured to detect the presence of the action of the force based on a steering angle detected by a steering angle sensor.

4. The continuously variable transmission according to claim 1, wherein
the controller is further configured to detect the presence of the action of the force based on navigation information.

5. The continuously variable transmission according to claim 1, wherein
the controller is further configured to determine a state of a road or a road surface on which the vehicle is travelling to detect the presence of the action of the force from the state of the road or the road surface.

6. The continuously variable transmission according to claim 5, wherein
the controller is further configured to determine the state of the road or the road surface based on a signal from a camera sensor.

7. The continuously variable transmission according to claim 1, wherein
the controller is further configured to detect the relative movement of an element of the plurality of elements based on a signal from a laser sensor.

8. The continuously variable transmission according to claim 1, wherein
the controller is further configured to reduce a torque input to the primary pulley as the falling-off countermeasure control.

9. The continuously variable transmission according to claim 1, wherein
as driving sources of the vehicle on which the continuously variable transmission is mounted, the vehicle including:
a first driving source; and
a second driving source arranged to transmit a power to driving wheels without being via the continuously variable transmission, the second driving source being different from the first driving source, and the controller is further configured to increase a torque of the second driving source as the falling-off countermeasure control.

10. The continuously variable transmission according to claim 1, wherein
the controller is further configured to increase a pressure of a hydraulic oil of the continuously variable transmission, the increased pressure generating a pulley thrust as the falling-off countermeasure control.

11. The continuously variable transmission according to claim 1, wherein
the controller is further configured to spray a lubricating oil of the continuously variable transmission to a part preliminarily determined as a part where a concentration of end plays is generated on the belt as the falling-off countermeasure control.

12. The continuously variable transmission according to claim 1, wherein
the controller is further configured to execute the falling-off countermeasure control when the continuously variable transmission is in a preliminarily set condition as a condition where a widening or a concentration of end plays is generated on the belt.

13. A control method for controlling a continuously variable transmission, the continuously variable transmission including a plurality of elements receiving a ring in receiving portions opening in a radial direction of a belt and being bundled by the ring, the control method comprising:
assuming a direction perpendicular to a circumferential direction and a radial direction of the belt as a lateral direction, detecting a relative movement of an element of the plurality of elements in the lateral direction with respect to the ring or detecting a presence of an action of a force in the lateral direction on an element of the plurality of elements; and
executing a preliminarily determined falling-off countermeasure control of an element of the plurality of elements when the relative movement of an element of the plurality of elements is detected or the action of the force on an element of the plurality of elements is detected.

14. A continuously variable transmission mounted on a vehicle, comprising:
a primary pulley;
a secondary pulley;
a belt wound around the primary pulley and the secondary pulley, the belt including:
a ring; and
a plurality of elements bundled by the ring, the elements having respective receiving portions opening in a radial direction of the belt, the elements receiving the ring in the receiving portions;
means for, assuming a direction perpendicular to a circumferential direction and a radial direction of the belt as a lateral direction, detecting a relative movement of an element of the plurality of elements in the lateral direction with respect to the ring or detecting a presence of an action of a force in the lateral direction on an element of the plurality of elements; and
means for executing a preliminarily determined falling-off countermeasure control of an element of the plurality of elements when the relative movement of an element of the plurality of elements is detected or the action of the force on an element of the plurality of elements is detected.

* * * * *